United States Patent Office 3,531,261
Patented Sept. 29, 1970

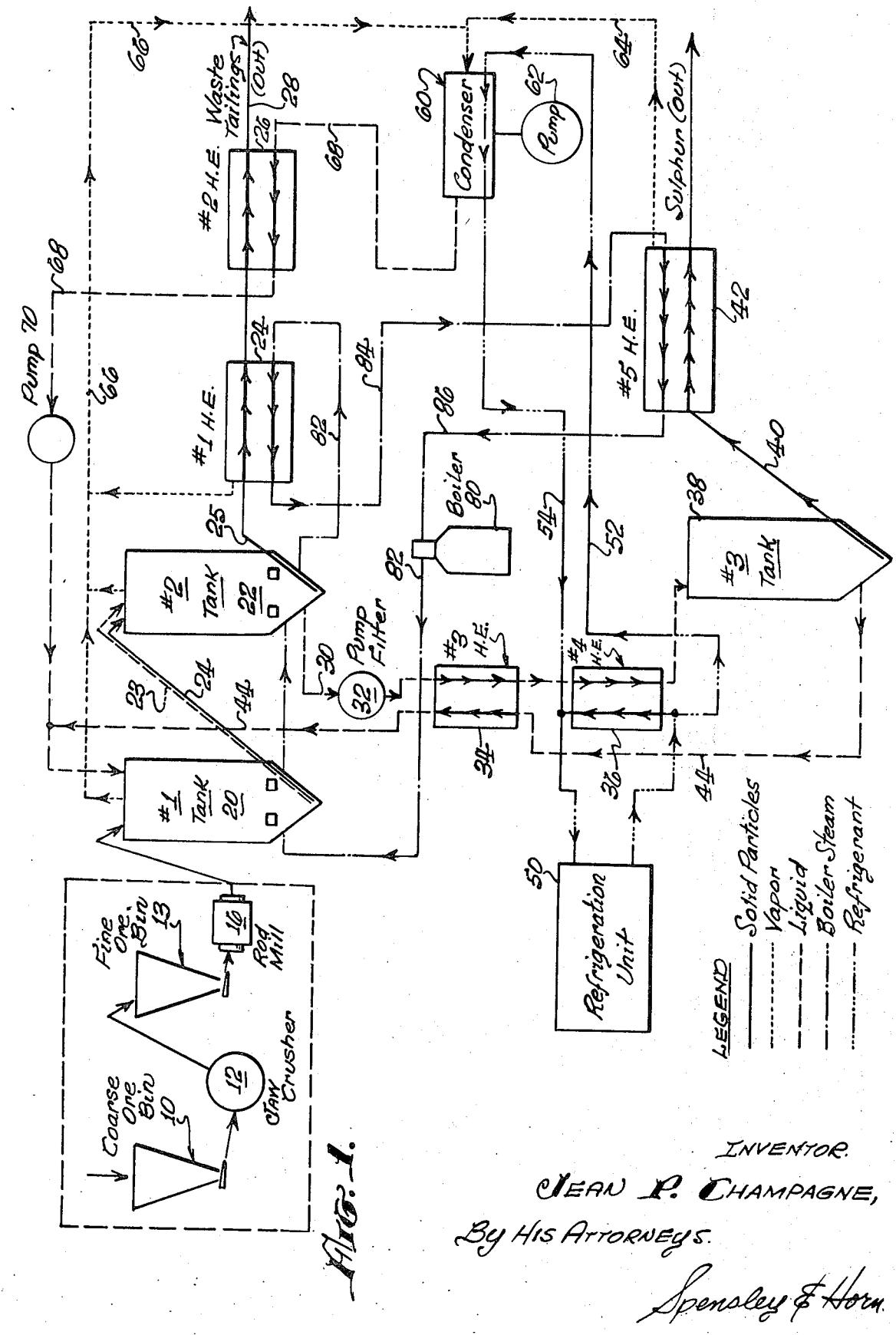

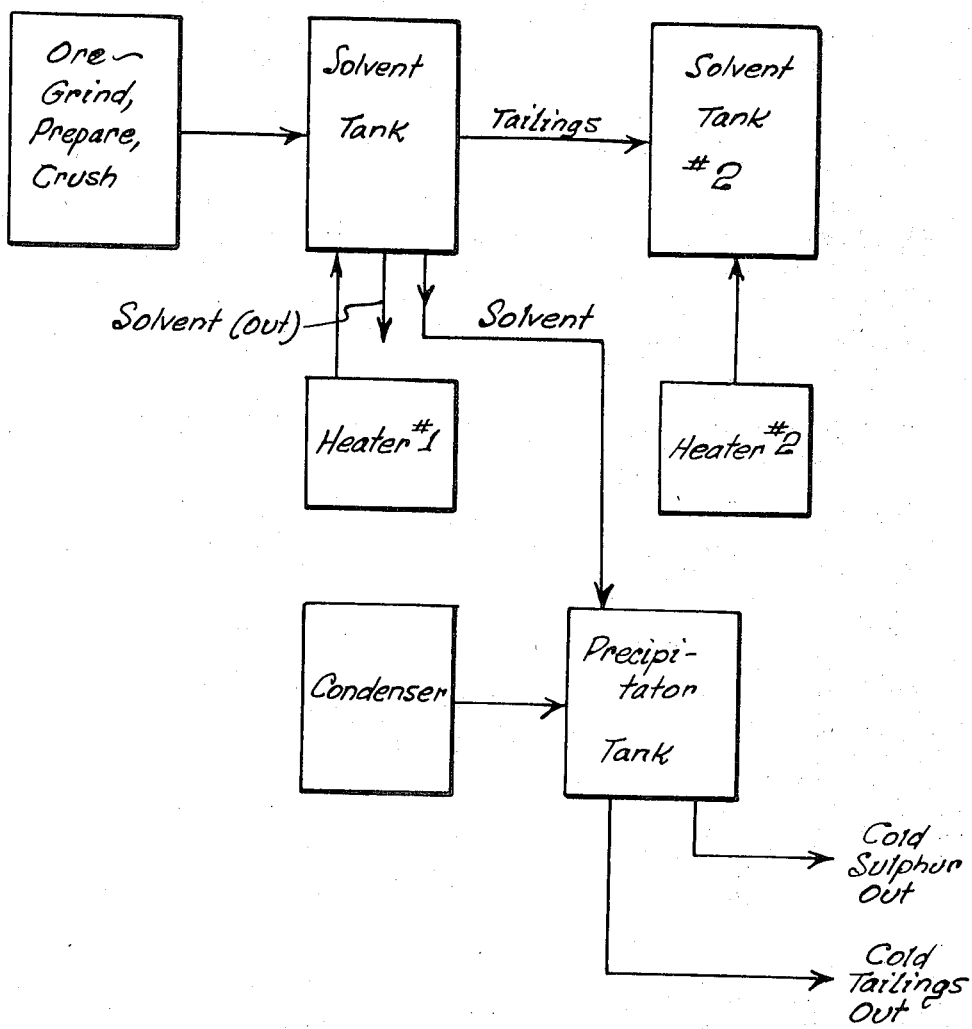

3,531,261
SULFUR ORE REFINING PROCESS
Jean P. Champagne, Santa Monica, Calif., assignor, by mesne assignments, to Bramada Resources Limited, Vancouver, British Columbia, Canada
Filed July 17, 1967, Ser. No. 653,989
Int. Cl. B01d 11/02; C01b 17/08
U.S. Cl. 23—312                                    6 Claims

ABSTRACT OF THE DISCLOSURE

A method of extracting sulfur from its ore comprising the steps of, crushing the sulfur and passing the ore sequentially through two absorption tanks containing hot solvent; passing the hot tailings from the second absorption tank through a heat exchanger thereby heating incoming solvents passing through the heat exchanger so that the solvent is preheated before it enters the first absorption tank. Extracting the sulfur from its ore by hot solvation (utilizing preheated solvent) then passing the hot solvent through a heat exchanger which is also conducting refrigerant, thereby partially cooling the hot solvent, and finally cooling the sulfur laden solvent to a point where the sulfur precipitates out.

BACKGROUND OF THE INVENTION

Field of the invention

This invention relates to a method of extracting sulfur from its ore and particularly to a method of preheating the extracting solvent by heat exchanging it with hot sulfur tailings prior to the extraction step, and of supplying thermodynamically efficient conduit circuits for the process.

Description of the prior art

The source of commercial sulfur for many years has been sulfur beds in Louisiana and other Gulf areas. Also there are sulfur deposits in mountainous areas such as near Death Valley, California, for example. In these beds raw sulfur is capped by salt domes and these beds are relatively accessible. However, to the present date there has been no economically feasible way of refining sulfur from its ore, that is, no commercially feasible process for taking sulfur from deposit other than the Gulf type deposits. Such an ore refining process would be much more expensive than that used for refining of sulfur from the sulfur beds and therefore cannot compete commercially. In recent years the sulfur industry has witnessed an increasing demand for elemental sulfur. This demand has resulted in efforts to recover sulfur from these mineral ores and deposits which heretofore have been considered nonprofitable. One of the processes that can be applied to the recovery of elemental sulfur from mineral ores is a solvent extraction process. There are of course several sulfur solvents known, such for example as carbon disulfide. However, most of these solvents are subject to the objection that they are either toxic or require too much heat energy to heat them or cooling energy to cool them sufficiently to precipitate out the sulfur. Accordingly, the present concept is an ore refining process which is much more thermodynamically efficient than prior art ore refining processes. This efficiency is accomplished by preheating the solvent used in the extraction process by placing it in heat exchange relationship with hot tailings of the ore as it passes out of the process cycle.

It is a primary object of the present invention to provide a thermodynamically efficient process for deriving elemental sulfur from its ore. Another object of the present invention is to provide a solvent extraction process for the recovery of sulfur from its ore in which the solvent is preheated prior to extracting the sulfur. Yet another object of the present invention is to provide a sulfur extraction process by which the solvent is preheated by passing it through a heat exchanger through which hot sulfur ore tailings have been passed.

SUMMARY OF THE INVENTION

In one of its broadest aspects the present invention comprises a process for extracting elemental sulfur from its ore comprising the steps of; crushing the ore to a predetermined particle size; extracting sulfur from the ore by contacting hot solvent with the ore particles; separating the sulfur laden solvent from the residual ore particles; cooling the sulfur laden solvent by passing it in heat exchange relationship with cold solvent from which the sulfur has been precipitated; removing the sulfur from the sulfur laden solvent and preheating the unsaturated sulfur extracting solvent by passing it in heat exchange relationship with hot discharge products of the extraction step thereby utilizing heat therefrom.

The advantages of the present process are that it utilizes heat from the one extracting step of the process to preheat the solvent which is used in the extraction step, and also cools the sulfur solution prior to the precipitation step by heat exchanging with cold solvent. Thus the conduit circuits employed provide a thermodynamically efficient system with a minimum heat loss. This makes feasible the economical refining of sulfur from its ore.

The novel features which are believed to be characteristic of the invention, both as to its organization and method of operation, together with further objects and advantages thereof will be better understood from the following description considered in connection with the accompanying drawings in which a presently preferred embodiment of the invention is illustrated by way of example. It is to be expressly understood, however, that the drawings are for the purpose of illustration and description only, and are not intended as a definition of the limits of the invention.

BRIEF DESCRIPTION OF THE DRAWINGS

FIG. 1 is a flow chart of the invented sulfur extracting process.

FIG. 2 is a simplified schematic of the sulfur extracting process.

DESCRIPTION OF THE PREFERRED EMBODIMENTS

Referring now to FIGS. 1 and 2 the first step in the present process is to crush and grind sulfur ore to an optimum particle size. In practice it has been found that ten mesh is a convenient size to use. In the presently preferred process embodiment this is accomplished by feeding the ore into a coarse ore bin 10, having a vibrating feeder at its bottom. The ore is then fed into a jaw crusher 12. From the jaw crusher, the crushed ore is taken by a heated screw conveyor 13 and dumped into a fine ore bin 14. It is desirable to heat the screw conveyor in order to dry the ore that it is carrying, this is because it is undesirable to contaminate the liquid solvent used in the extraction with water carried as moisture in the ore. The fine ore bin 14 also has a vibrating feeder at its bottom which feeds the ore into a rod mill 16. The output of the rod mill having a particulate size preferably on the order of ten mesh. A typical feed rate of ore into the mill is about one ton per minute and a system output of refined sulfur assuming a 30% sulfur content in the ore is about 300 tons per day.

The output of rod mill 16 is conducted through conduit 18 into a first absorption tank 20. The next step then is to contact the crushed ore particles in absorption tank 20 with a hot solvent entering tank 20 through conduit 68. The solvent contacting the ore particles is sufficiently hot to form a solution or a suspension of elemental sulfur. With trichloroethylene for example a solvent temperature of 170° F. is desirable. After a first contacting period in the first absorption tank 20 the contents of tank 20 are pumped through conduit 23 and 21 into the second absorption tank 22. The sulfur ore is then recontacted for another period of time in the heated second absorption tank. Both absorption tanks are steam-jacketed and maintain the solvent therein at a temperature of approximately (when trichloroethylene is used) 170° so that the sulfur will almost immediately go into solution or suspension. The output from rod mill 16 is fed into the top of the first absorption tank; the particles falling by gravity down through the solvent during which time the sulfur is taken into suspension or solution. Near the bottom of the tank there is provided an ultrasonic vibrator or other suitable agitating means to ensure dispersion of the particles and also more intimate contact of ore particles with the solvent. The two absorption tanks are identical in construction and are preferably 4,000 gallon capacity tanks. The solvent used can be any suitable sulfur extracting solvent, which when hot, takes sulfur into solution or suspension and which when cooled will precipitate sulfur therefrom. The solvent can also be one such for example as kerosene, which when sulfur is in solution or suspension a further heating of the solvent may precipitate sulfur therefrom. All that is required of the solvent is that hot sulfur is readily taken into suspension or solution thereby, and that elemental sulfur can readily be removed therefrom by precipitation or other means. Some typical solvents are trichlorethylene, carbon disulfide or other organic polysulfides, kerosene or other saturated hydrocarbon solvents. The ore tailings and liquid suspension are drawn from the bottom of the second absorption tank 22 and fed by a screw elevator 25 and passed through a heat exchanger 24. The liquid sulfur suspension (ore solution) is separately drawn off from the second absorption tank 22 through line 30 and is then passed through a pump filter 32 and through a heat exchanger 34. Conveyor 25 is steam-jacketed and is maintained at a temperature of about 225–230° F. which is slightly less than the 240° F. melting point of sulfur. The purpose of steam heating this conveyor is to volatilize any solvent carried by the tailings. It is of course within the scope of the invention to provide an absorption tank in which the ore-solvent contact time is great enough that two separate tanks need not be used. Alternatively it is within the scope of the invention to provide a counercurrent screw conveyor or a contactor in which a constant stream of hot solvent may be circulated over the sulfur ore. In any event, any means of contacting fresh hot solvent with sulfur ore would be sufficient.

The solvent vapor from the two absorption tanks and from heat exchanger 24 is sucked off by a suction fan and carried by a common duct 66 to a condenser 60 which liquifies the vapors and recovers the solvent; the liquid solvent then being recirculated back into the first absorption tank 20 as will be herein below explained. The tailings on conveyor 25 pass through heat exchanger 24 which is a steam-jacketed conveyor. This maintains the tailings as previously explained at approximately 235° F. and drives off any entrained solvent. The tailings are then conveyed into a second heat exchanger 26 which in effect is a conveyor which is jacketed with a cold solvent so that the heat given up by the tailings will preheat the solvent before it is fed into the absorption tanks. Thus, the heat of the tailings which ordinarily would be lost is, in the present process, utilized to preheat solvent which after it is passed into a first absorption tank is further heated to attain the required sulfur solvating temperature of about 170° F. After passing through the second heat exchanger 26 cold solvent issuing from condenser 60 attains a temperature of approximately 140° F. Thus, it is only required to heat the solvent an additional 30° F. to attain a solvating temperature of 170° F. This is in contrast to prior art processes in which room temperature solvent has to have its temperature raised approximately 100° F. to attain the desired temperature. The heat requirements in terms of B.t.u. per minute to a 60 ton per hour sulfur recovery plant without heat recovery has been calculated to be 710,274 B.t.u. total heat input. This includes, heat to raise the sulfur ore temperature (1 ton) from 60° F. to 170° F.; to raise temperature of solvent from 32° F. to 170° F. and to reduce the temperature of solvent from 170° F. to 32° F. to precipitate sulfur.

In the same plant embodying the heretofore described heat exchangers with the same amount of solvent on both sides of the system, the temperature of the cold solvent will be raised from 32° F. to 140° F. (by heat exchange with hot ore tailings). The temperature of the hot solvent will be lowered from 170° F. to 60° F. (by heat exchange with cold solvent from the precipitation tank). The heat with cold solvent from the precipitation tank). The heat requirement to raise 425 gallons/minute of solvent from 140° F. to 170° F. is approximately 33,891 B.t.u./minute. To lower the solvent temperature (prior to precipitation of sulfur) from 60° F. to 32° F. 75,650 B.t.u./minute is required. Thus total B.t.u. input for both heating and refrigeration is 109,541 B.t.u.

But using cold solvent to cool hot ore tailings and assuming 75% recovery of the 44,000 B.t.u. applied to heat the sulfur ore the net B.t.u. requirement will be 109,541− (44,000×0.75)=76,541 B.t.u. Percentage of heat saved by the present invention is therefore approximately 85%.

Waste tailings are dumped from heat exchanger 26 by conduit 28. The next step in the process is to remove the sulfur laden solvent from absorption tank 22 by means of conduit 30 through a pump filter 32 and into a heat exchanger 34. The sulfur laden solvent is thus in heat exchange relationship with solvent which is coming through conduit 44 and through heat exchanger 34 from which the sulfur has previously been precipitated and which solvent is therefore unsaturated and is in a cool condition. Thus, unsaturated solvent passing from tank 38 through conduit 44 and through heat exchanger 34 takes up heat from hot solvent solution passing through conduit 30 and heat exchanger 34. This heat exchange relationship partially cools the sulfur laden solvent which is next passed through heat exchanger 36. In passing through heat exchanger 36 the sulfur laden solvent is in heat exchange relationship with a refrigerant which passes through the heat exchanger. Thus, the solvent is cooled to a sulfur precipitating temperature and passes into precipitating tank 38. It can be seen that it is more thermodynamically efficient to cool the sulfur laden solvent that is leaving the second absorption tank by two or more in-line heat exchangers than it would be to dump the entire 4,000 gallon contents of such tank into a refrigeration system from 200° F. down to 32° F. which is the temperature at which sulfur can be precipitated from its solvent. Precipitation tank 38 may be suitably insulated to prevent an undue temperature rise of the solution for the few minutes it is in the tank. In the precipitation tank, the sulfur precipitates out and collects at the tank bottom. The sulfur is picked up by screw elevator 40 and is fed into a heated conveyor 42 which vaporizes any remaining solvent and drives it off. This heating is accomplished by stream which is withdrawn by conduit 86 from heat exchanger 42. Heat exchanger 42 is connected to a suction system which collects the vapors and which passes them through conduit 64 to the condenser. The solvent from the bottom of precipitation tank 38 passes through conduit 44 and through heat exchanger 34. This solvent being at approximately 32° F. when it leaves the precipitation tank serves to partially cool the sulfur laden solvent which is proceeding through conduit 30 towards the precipitation tank. Thus, the unsaturated solvent is preheated prior to passing into the first absorption tank for recycling and to extract sulfur from the ore. A second heat exchanger 36 is provided in the input line to the precipitation tank 38 in order to cool the liquid suspension down to 32° F. The second heat exchanger is cooled by a refrigeration system 50 which also provides cooling for condenser 60. The refrigerant is passed through a conduit circuit 52 to condenser 60 and out of condenser 60 through conduit circuit 54 and through heat exchanger 36 through its jacket. The precipitated elemental sulfur in tank 38 proceeds through a screw elevator 40 through heat exchanger 42 which maintains the sulfur at an elevated temperature such that entrained solvent can be removed by suction and passed through the condenser 60 where it is liquified. Heat exchange 42 can be essentially a steam-jacketed conveyor which is heated by steam conduit 86.

A boiler 84 provides the steam for the steam-jacketed first and second absorption tanks 20 and 22; for the first heat exchanger 24, and for heat exchanger 42, the steam being supplied by the following conduit circuits 82, 84 and returning from the heat exchanger 42 through conduit 86 to the boiler 80.

Solvent reclamation is accomplished by connecting a suction fan through a common duct to the first and second absorption tanks 20 and 22, and to heat exchanger 24 and 42, whereby solvent vapors are passed through conduits 64 and 66 into condenser 60. Condenser 60 is refrigerated and the solvent vapors are liquified therein. The liquid solvent then leaves condenser 60 through conduit 68 which passes in heat exchange relationship through heat exchanger 26 where it is preheated prior to being pumped into the first absorption tank as previously explained. In an alternate embodiment of the invention, sulfur may be removed from the bottom of precipitation tank 38 and passed through a centrifuge to thereby separate solid sulfur from the mother liquor. The solid sulfur can then be passed through a steam-jacketed conveyor to remove any entrained solvent.

It is apparent from the foregoing that a significant advantage of the present sulfur refining process is due to the conservation of heat by passing ore tailings at a temperature in excess of 200° F. in heat exchange relationship with solvent passing from the condenser to a first absorption tank. The solvent thus is preheated prior to entering the absorption tank. There is therefore, a lesser requirement of thermal energy to bring the solvent up to the required 170° F. than would be necessary if solvent at a temperature of approximately 32° F. were heated to 170° F. A further heat conservation is accomplished by passing hot sulfur laden solvent from the second absorption tank in heat exchange relationship with unsaturated solvent at 32° F. which is coming from the precipitation tank. Thus, the unsaturated solvent is preheated prior to entering the first absorption tank.

Although this invention has been disclosed and illustrated with reference to a particular application, the principles involved are susceptible of numerous other applications which will be apparent to persons skilled in the art. The invention is, therefore, to be limited only as indicated by the scope of the appended claims.

What is claimed is:

1. In a process for extracting sulfur from its ore which includes the steps of:
   crushing the ore to a predetermined particle size;
   extracting sulfur from the ore by contacting said ore particles with hot solvent;
   separating the sulfur laden solvent from the residual ore particles; and
   removing the sulfur from said sulfur laden solvent; the improvement which comprises preheating the unsaturated sulfur extracting solvent by passing it in indirect heat exchange relationship with hot discharge products of the extraction step thereby utilizing heat therefrom.

2. In a process for extracting sulfur from its ore which includes the steps of:
   crushing the ore to a predetermined particle size,
   extracting sulfur from the ore by contacting the ore with a hot solvent such that said hot solvent forms a solution of elemental sulfur in said solvent;
   separating the sulfur laden solvent from the residual ore particles;
   cooling the sulfur laden solvent to a sulfur preciptating temperature and precipitating sulfur therefrom resulting in a cold sulfur-lean solvent;
   separating and drying the precipitated sulfur;
   the improvement which comprises preheating the cold sulfur-lean solvent by passing it in indirect heat exchange relationship with hot discharge products of the extraction step, thereby utilizing heat therefrom and precooling the sulfur laden solvent by indirectly heat exchanging it with cold sulfur-lean solvent.

3. The process as defined by claim 2 wherein the solvent is capable of rapidly extracting sulfur from its ore at a solvent temperature of approximately 170° F. and above and which solvent releases sulfur at temperatures below 170° F.

4. The process as defined in claim 3 wherein said solvent is selected from the group consisting of trichlorethylene, organic polysulfides, and saturated hydrocarbon.

5. In a process for extracting sulfur from its ore including the steps of: crushing the ore, extracting the sulfur from the ore by contacting it with hot solvent, separating the sulfur laden solvent from the residual ore particles and removing the sulfur from the sulfur laden solvent by cooling said sulfur laden solvent to precipitate sulfur and separating said precipitated sulfur from said cooled solvent:
   the improvement of which comprises preheating the sulfur extracting solvent before it is contacted with sulfur bearing ore by passing it in indirect heat exchange relationship with hot discharge products of the extraction step, thereby utilizing heat therefrom, and precooling the sulfur laden solvent by indirectly heat exchanging it with cold solvent from which the sulfur has been removed.

6. In a process for extracting sulfur from its ore which includes the steps of:
   crushing the ore to a predetermined particle size;
   extracting sulfur from the ore by contacting the ore with a hot sulfur solvent;
   separating the sulfur bearing solvent from the contacted ore particles;
   cooling the sulfur laden solvent to a sulfur precipitating temperature and precipitating sulfur therefrom;
   separating and drying the precipitated sulfur;
   the improvement which comprises preheating the sulfur extracting solvent by passing it in indirect heat exchange relationship with hot discharge products of the extraction step, thereby utilizing heat therefrom;
   precooling the sulfur bearing solvent by indirectly heat exchanging it with cold solvent from which the sulfur has been removed; and
   collecting and condensing solvent vapors released in the process and recycling the condensed liquid solvent.

References Cited

UNITED STATES PATENTS

| | | | |
|---|---|---|---|
| 166,279 | 8/1875 | Johnson | 23—312 |
| 833,573 | 10/1906 | Becigneul | 23—312 X |
| 1,963,921 | 6/1934 | Nagelvoort | 23—312 X |
| 2,118,140 | 5/1938 | Beattie | 23—312 X |
| 2,340,232 | 1/1944 | Syers | 23—312 |
| 2,409,408 | 10/1946 | Tweeddale | 23—312 |
| 2,785,059 | 3/1957 | McDonald | 23—312 X |
| 2,897,065 | 7/1959 | Capell | 23—312 |

NORMAN YUDKOFF, Primary Examiner

S. J. EMERY, Assistant Examiner

U.S. Cl. X.R.

23—224, 299, 308